United States Patent
Lin (10) Patent No.: US 7,840,888 B2
(45) Date of Patent: Nov. 23, 2010

(54) ARCHITECTURE AND METHODOLOGY OF REDIRECTION FOR DYNAMIC NEW URL LINKS (76) Inventor: Jimmy Jong-Yuan Lin, 4F, No. 19-13, Sanchong Rd., Nangang District, Taipei City 115 (TW)

( * ) Notice: Subject to any disclaimer, the term of this patent is extended or adjusted under 35 U.S.C. 154(b) by 1139 days.

(21) Appl. No.: 11/225,074

(22) Filed: Sep. 14, 2005

(65) Prior Publication Data

US 2006/0059416 A1    Mar. 16, 2006

(30) Foreign Application Priority Data

Sep. 16, 2004    (TW) ............................... 93128046 A (51) Int. Cl.
G06F 17/00    (2006.01)
G06F 15/16    (2006.01)
(52) U.S. Cl. ...................... 715/208; 709/203
(58) Field of Classification Search ............... 715/200, 715/205, 206, 207, 208, 234, 255; 709/203
See application file for complete search history.

(56) References Cited

U.S. PATENT DOCUMENTS

| 5,958,008 A * | 9/1999 | Pogrebisky et al. ......... 709/223 |
| 6,061,690 A * | 5/2000 | Nori et al. ............... 707/103 R |
| 6,266,681 B1 * | 7/2001 | Guthrie ...................... 715/234 |
| 6,886,013 B1 * | 4/2005 | Beranek ...................... 707/10 |
| 7,016,977 B1 * | 3/2006 | Dunsmoir et al. ........... 709/246 |

* cited by examiner

Primary Examiner—Laurie Ries
(74) Attorney, Agent, or Firm—Rosenberg, Klein & Lee (57) ABSTRACT

An architecture and methodology of redirection for dynamic new URL Links uses a first server device to get information flow content from a second server device. By inserting an application into the information flow content retrieved from the second server device, the first server device replaces the web objects, which may generate dynamic new URL links, with the redirect functions in the code and sends the content to the browser. The browser will execute the code automatically. Whenever the browser generates new dynamic new URL links, it would call the provided redirect functions, and thus redirect them and retrace back to the first server device.

16 Claims, 5 Drawing Sheets

Figure 1 (well-known knowledge)

ARCHITECTURE AND METHODOLOGY OF REDIRECTION FOR DYNAMIC NEW URL LINKS

BACKGROUND OF THE INVENTION

1. Field of the Invention

This present invention relates to an architecture and methodology of redirection for dynamic new URL links especially in redirecting the dynamic new URL links to a first sever device.

2. Description of Prior Art

As electronic information products become popular and the hardware and software of Internet make big progresses, the exchange of plain text, pictures or music have moved from storing them in storage devices to flowing them via Internet. No matter where the senders and the receivers are, any information exchange can be done via the Internet.

Figure 1:
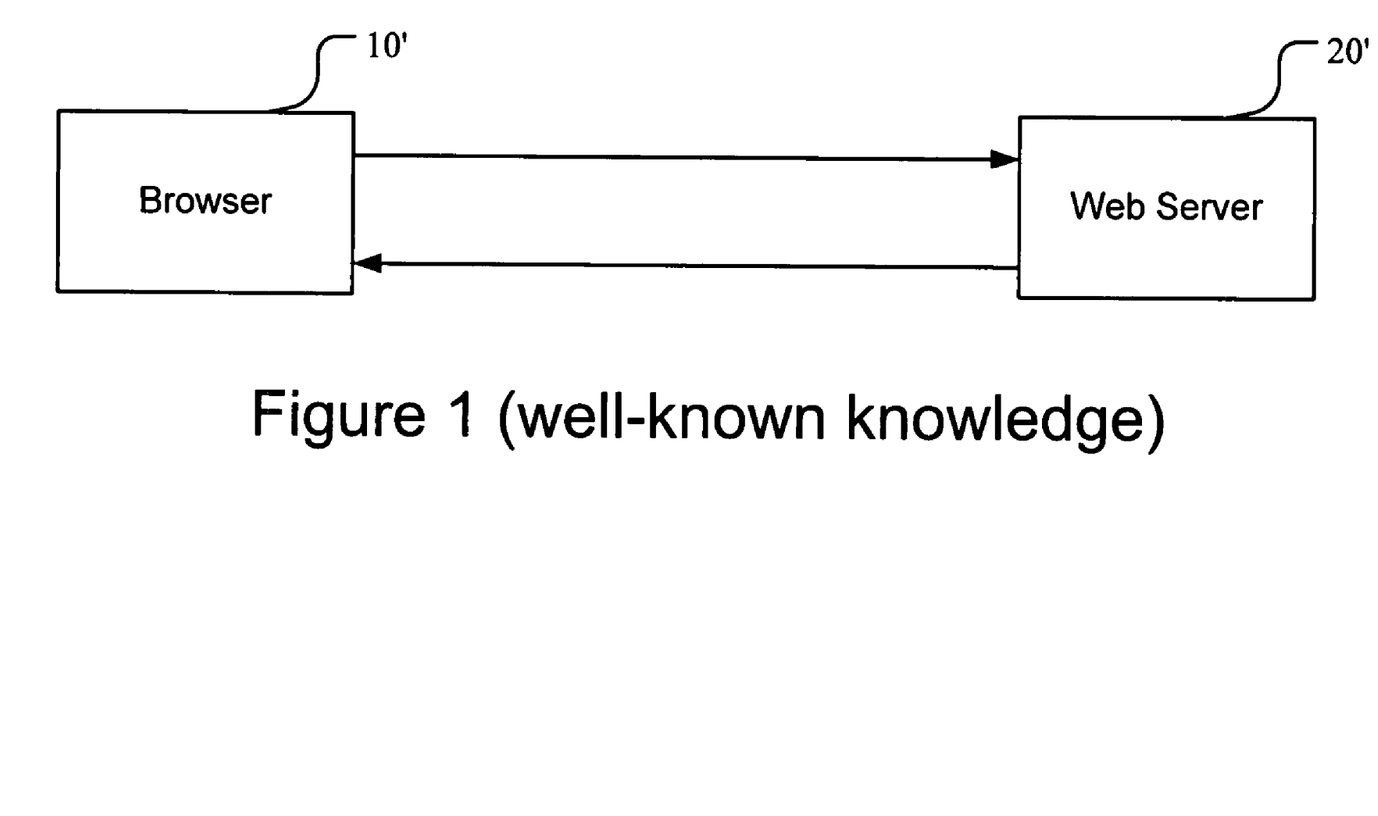
FIG. 1 shows the block of the interaction between browser and web Server of the prior art.

Using the Internet, a client usually types in a Universal Resource Locater (URL) from his browser. An URL indicates a resource link. Every URL link, Host Name+Web Object, indicates the location of its host name and the type of its web object, which may reside on any server in the world. In addition, the execution of the URL link means an "information flow", which links to an object on the host name server. For example, FIG. 1 shows the well-known interaction between a browser and a web server. When a user types http://www.hinet.net/services.html from his browser 10', browser 10' sends the request to Web Server 20' in the link. The web object is executed at client side; therefore, it is possible that dynamic new URL generated by browser 10' may link to different server from web server 20'. In this situation, new information flow loses connection with web server 20'. As a result, new links may get the web pages in different languages, which makes users hard to read.

In the following sections, some examples are provided to describe how connection loss with web server 20' could happen while using HTML DOM's .innerHTML, .outerHTML, .href, .location properties; JavaScript eval( ) function; and HTML DOM window.open( ), document.writeln( ) methods. In addition, there are other properties, method, and javascript functions, but are not limited to, such as .src, .action; and other methods such as window.showModalDialog( ), document.write( ), and others, could cause connection loss as well. Due to the similarity, these examples are omitted.

EXAMPLE 1_1

Information Flow Content Containing .innerHTML Property

```
1 <head>
2 <script type="text/javascript">
3 function myHref( )
4 {
5    document.body.innerHTML="<a id=\"myAnchor\"
6    href=\"http://www.w3schools.com\">Visit
7    W3Schools</a>";   }
8 </script>
9 </head>
10
11 <body>
12 <a id="myAnchor"
13 href="http://www.microsoft.com">Visit microsoft</a>
14 <form>
15 <input type="button" onclick="myHref( )" value="Change URL and
16 text">
17 </form>
18   </body>
``` hinet.net domain via www Internet protocol. Then, the Web Server responses the information flow content of "services.html" object back to the client. In this scenario, every execution of an URL link means a lot of processing and exchanges of information flow content. The most used web page objects of URL information flow content can be subdivided into nine categories, but are not limited to, as below:

1. HTML hypertexts web page: html, htm, asp, aspx, jsp, php, php4, xml, . . . etc.
2. Images file: gif, jpg, . . . etc.
3. Java Applet
4. JavaScript functions or JavaScript files
5. Microsoft document objects: doc, xis, ppt, mdb
6. Adobe object: pdf
7. Macromedia flash object: swf
8. IBM Lotus Notes: nsf
9. Other objects: txt, csv, tab, asc, and css Although the technology improvements make communication between people easier and faster, there are drawbacks when using URL links to exchange information. One of those drawbacks is users usually feel difficulties in viewing web pages which are in languages they are not familiar with. It happens when information flow content from web server 20' may contain at least one web object which generates dynamic new URL From the example 1_1, it contains .innerHTML property in the code line 5~7. This property would link to http://www.w3schools.com web object dynamically.

EXAMPLE 1_2

Information Flow Content Containing .outerHTML Property

```
1 <html>
2 <head>
3 <SCRIPT>
4 function fnCopyHTML( ) {
5     var oWorkItem = event.srcElement;
6     if((oWorkItem.tagName != "UL") &&
7     (oWorkItem.tagName != "LI"))
8 {
9   if(oWorkItem.outerHTML== "<B>Visit Microsoft</B>")
10   {       oWorkItem.outerHTML = "<a id=\"myAnchor\"
11       href=\"http://www.microsoft.com\">" +
12     oWorkItem.outerHTML + "</a>";
13  }
14 if(oWorkItem.outerHTML=="<B>Visit 3Schools</B>")
15   { oWorkItem.outerHTML = "<a id=\"myAnchor\"
16       href=\"http://www.w3schools.com\">" +
17       oWorkItem.outerHTML + "</a>";
18    }
19  }
20 }
21 </SCRIPT>
22 </head>
23 <body>
24 <UL onclick = "fnCopyHTML( )">
25 <LI><B>Visit Microsoft</B>
26 <LI><B>Visit W3Schools</B>
27 </UL>
```

-continued

```
28 <P>
29 <DIV ID = "oScratch" >
30 </DIV>
31 </body>
32 </html>
```

From the example 1_2, it contains .outerHTML property in the code line 9~12 and line 14~17. This property would link to http://www.microsoft.com or http://www.w3schools.com web object dynamically.

EXAMPLE 1_3

Information Flow Content Containing .href Property

```
1 <html>
2 <head>
3 <script type="text/javascript">
4 function myHref( )
5 {
6 document.getElementById('myAnchor').href=
7 "http://www.w3schools.com"
8 }
9 </script>
10 </head>
11 <body>
12 <a id="myAnchor" href=
13 "http://www.microsoft.com">Browsing...</a>
14 <form>
15 <input type="button" onclick="myHref( )"
16 value="Change URL">
17 </form>
18 </body>
19 </html>
```

>From the example 1_3, it contains .href property in the code line 6~7. This property would link to http://www.w3schools.com web object dynamically.

EXAMPLE 1_4

Information Flow Content Containing Location Property

```
1 <html>
2 <head>
3 <script type="text/javascript">
4 function change_Location( )
5 {
6 window.location="http://www.w3schools.com"
7 }
8 </script>
9 </head>
10 <body>
11 <form>
12 <input type="button" onclick="change_Location( )"
13    value="Change URL">
14 </form>
15 </body>
16 </html>
```

>From the example 1_4, it contains .location property in the code line 6. This property would link to http://www.w3schools.com web object dynamically.

EXAMPLE 1_5

Information Flow Content Containing eval( ) Function

```
1 <html>
2 <head>
3 script type="text/javascript">
4 function myHref( )
5 {
6 var link = "http://www.w3schools.com";
7 eval("document.getElementById('myAnchor').href=" +
8    link);
9 }
10 </script>
11 </head>
12 <body>
13 <a id="myAnchor"
14 href="http://www.microsoft.com">Browsing...</a>
15 <form>
16 <input type="button" onclick="myHref( )"
17 value="Change URLt">
18 </form>
19 </html>
20 </body>
```

>From the example 1_5, it contains eval ( ) function in the code line 6~9 and line 14. This function would link to http://www.w3schools.com or http://www.microsoft.com web object dynamically.

EXAMPLE 1_6

Information Flow Content Containing window.open( ) Method

```
1 <html>
2 <head>
3 <script type="text/javascript">
4 function open_win( )
5 {
6    window.open("http://www.w3schools.com")
7 }
8 </script>
9 </head>
10 <body>
11 <form>
12 <input type=button value="Open Window"
13    onclick="open_win( )">
14 </form>
15 </body>
16
17 </html>
```

\>From the example 1_6, it contains window.open( ) method in the code line 6. This method would link to http://www.w3schools.com web object dynamically.

EXAMPLE 1_7

Information Flow Content Containing document.write( ) Method

```
1 <html>
2 <body>
3 <a id="myAnchor" href="http://www.microsoft.com">Visit
4    Microsoft</a>
5 <script type="text/javascript">
6 var link="\"http://www.w3schools.com\"";
7 document.write("<a " + "id=\"myAnchor\"" + " href=" + link
8 + ">Visit W3Schools</a>");
9 </script>
10 </body>
11 </html>
```

From the example 1_7, it contains document.write( ) in the code line 6~9. This method would link to http://www.microsoft.com web object dynamically.

How to solve this problem? It has been long time having this question in the author's mind. To find a new way to redirect dynamic new URL links can solve the connection loss and web page viewing problems. The author has been in researching, and developing on new URL links' redirection projects for years. Finally, a new architecture for redirecting dynamic new URL links has been developed and implemented.

SUMMARY OF THE INVENTION

It is an object of the present invention is to provide a new algorithm and way to redirect and retrace the dynamic new URL links back to a first server device. It is implemented by adding the first server device, which inserts an application with the redirect functions in the code for these dynamic new URL web objects into the information flow content while it's retrieved from a second server device.

After replaces the web objects, which may generate dynamic new URL links, with the REDIRECT FUNCTIONS in the code, THE FIRST SERVER DEVICE sends the modified web content to the browser. The functions of the code are to parse the web content, redirect and retrace these dynamic new URL links back to THE FIRST SERVER DEVICE. The code will be executed automatically when it sent to the browser. Thus, dynamically generated URL links will be redirected and retraced back to THE FIRST SERVER DEVICE.

Another purpose of this invention is to provide an automatic web content translation function. THE FIRST SERVER DEVICE translates these web objects according to the parameters set in THE SECOND SERVER DEVICE. Thus, it could remove the barriers caused by different languages browser and different languages web content.

Yet another purpose of this invention is to provide an auto-detection function. THE FIRST SERVER DEVICE would auto-detect the language set in the browser and decide whether to make connection to THE SECOND SERVER DEVICE. If the browser '10 and server device '30 have same language setting, THE FIRST SERVER DEVICE would not do the unnecessary conversion, thus reduce the load to THE FIRST SERVER DEVICE.

DETAILED DESCRIPTION OF THE PREFERRED EMBODIMENTS

In order to make this invention easier to understand, some examples with more detailed explanations are provided below:

The Web Objects that generate dynamic new URL links are executed in the browser. In the process of information flow content, it is very likely to get unconverted text due to losing connection and control to the dynamic new URL links. This invention introduces a new way to redirect dynamic new URL links by adding THE FIRST SERVER DEVICE, which relays information flow content from second server device to the browser. When the information flow content gets by THE FIRST SERVER DEVICE, it inserts the redirection functions before passing it to the browser. Thus, whenever the dynamic new URL links are generated at browser side, this implementation guarantees to redirect them back to THE FIRST SERVER DEVICE.

Figure 2:
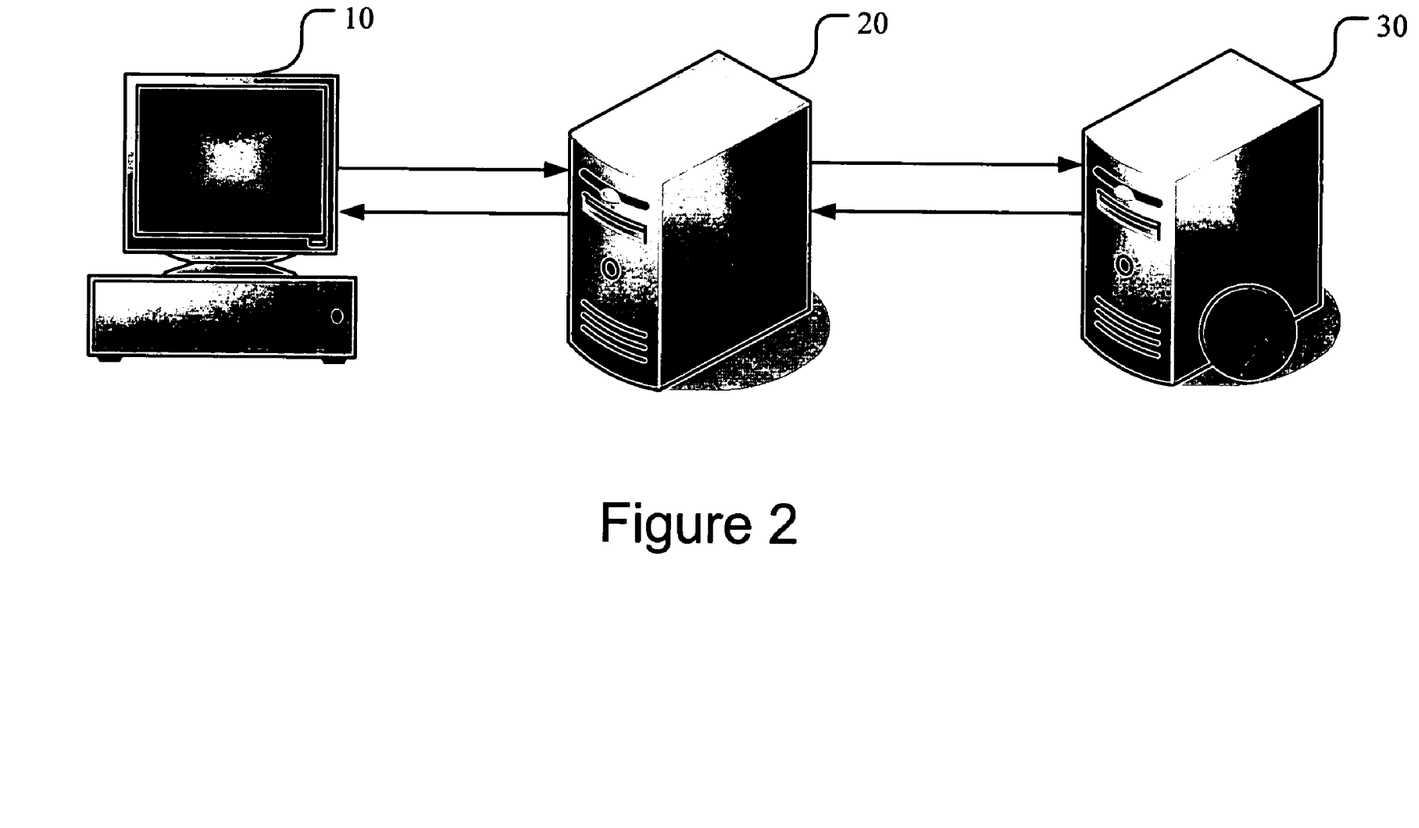
FIG. 2 shows the illustrated diagram of the architecture of the present invention.
Figure 3:
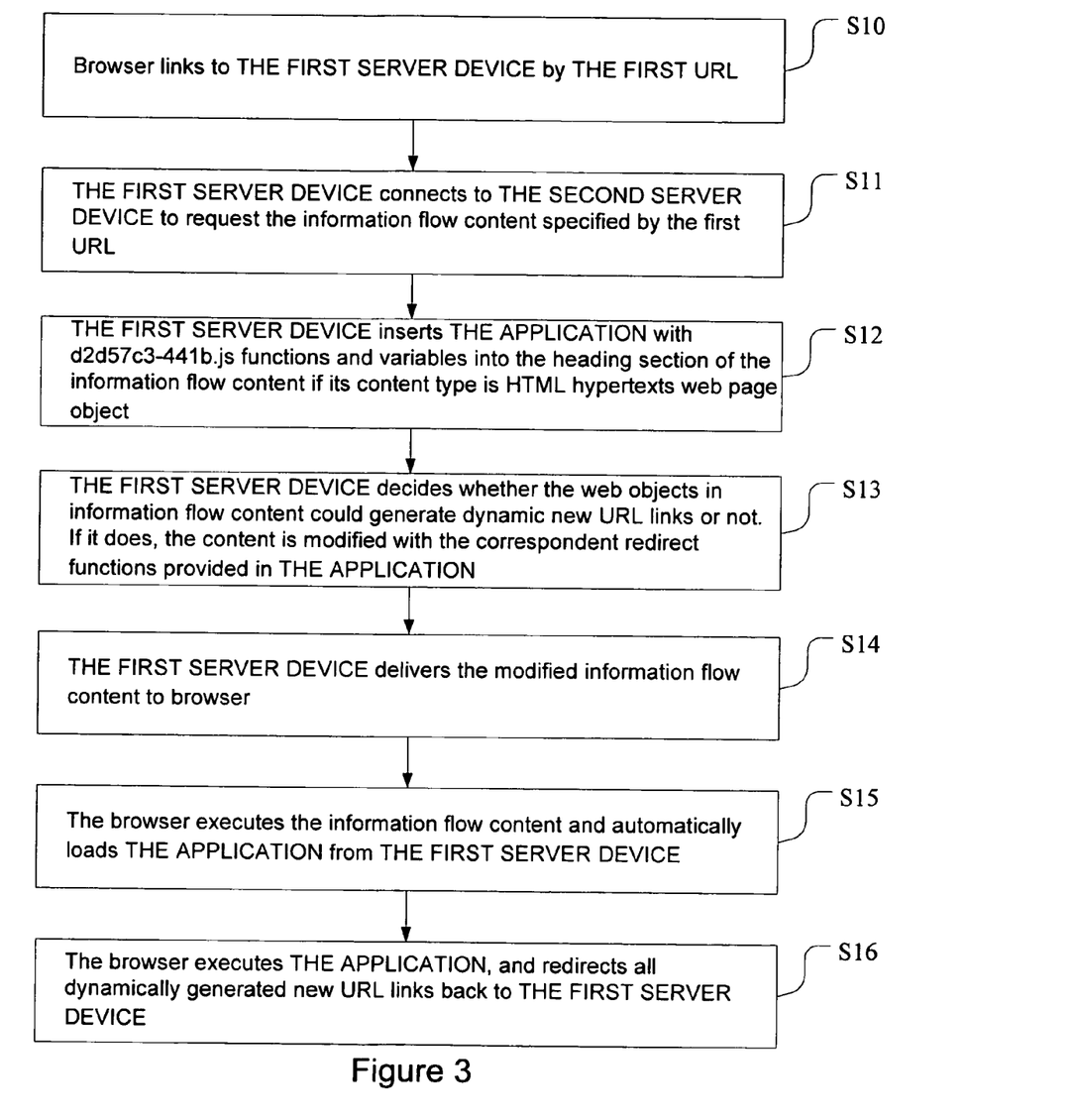
FIG. 3 shows the flow chart of the method of the present invention.

FIG. 2 and FIG. 3 are architecture and flow diagram of this invention. As shown in the figures, in step S10, a browser 10 connects to THE FIRST SERVER DEVICE 20 initiated by first URL. Then, THE FIRST SERVER DEVICE 20 executes step S11 that connects to THE SECOND SERVER DEVICE and the browser. According to the first URL, it sends request to THE SECOND SERVER DEVICE 30 for an information flow content. THE FIRST SERVER DEVICE 20 sends the requested information flow content to browser 10 on behalf of THE SECOND SERVER DEVICE 30.

In network operations, IP addresses are used to identify both side of a connection. An IP is composed by 4 numbers, such as 211.72.195.181. When a client uses browser 10, he has to enter an IP address to specify the host. IP addresses are hard to memorize, therefore, it comes the domain name server to rescue. Domain Name servers map a domain name to an IP address. To locate a server, users only need to memorize its domain name. For example, if a domain name server has an entry, which map URL of THE SECOND SERVER DEVICE 30 www.winperturn.com.tw to an IP 139.175.208.23. When a user enters www.winperturn.com.tw form the browser 10, the domain name server finds the entry and gets its IP address. The user now can make connection to THE SECOND SERVER DEVICE at IP address 139.175.208.23.

In order not to change the way that clients uses Internet. To achieve the goal THE FIRST SERVER DEVICE 20 acts as an entrance gate for the browser to THE SECOND SERVER DEVICE 30. When THE FIRST SERVER DEVICE 20 gets registration from THE SECOND SERVER DEVICE 30, it records the IP address of THE SECOND SERVER DEVICEs 30. The DNS entry of THE SECOND SERVER DEVICE 30 is replaced by THE FIRST SERVER DEVICE 20. Then, the browser connection to THE SECOND SERVER DEVICE 30 would automatically link to THE FIRST SERVER DEVICE

20. For example, assuming the Domain Name server records the entry www.winperturn.com.tw having the IP address 139.175.208.23, and the IP address of THE FIRST SERVER DEVICE 20 is 211.72.195.181, then, the entry's IP address for www.winperturn.com.tw in the Domain Server should be replaced by 211.72.195.181. When users type in the URL www.winperturn.com.tw, (trying to connect to THE SECOND SERVER DEVICE 30), DNS server would give the IP address of THE FIRST SERVER DEVICE 20.

THE FIRST SERVER DEVICE 20 knows the IP address of THE SECOND SERVER DEVICE 30. Therefore, whenever a client tries to connect to www.winperturn.com.tw, THE FIRST SERVER DEVICE 20 knows it is requesting an information flow content from THE SECOND SERVER DEVICE 30. Therefore, THE FIRST SERVER DEVICE 20 requests the information flow content from THE SECOND SERVER DEVICE 30, and relays it back to browser 10.

However, if the first information flow content dynamically generates new URL links requesting for other web objects, due to the behavior that URL links generated at client side at run-time, it could not be redirect back to THE FIRST SERVER DEVICE 20. In order to redirect dynamically generated URL links back to THE FIRST SERVER DEVICE 20, THE FIRST SERVER DEVICE 20 executes step S12, which inserting THE APPLICATION with d2d57c3-441b.js functions and variables into the heading section of the information flow content before it is sent to browser 10. As shown in the line 1 to 10 of following list.

THE APPLICATION with d2d57c3-441b.js functions and variables

```
1 <script language=JavaScript>
2 var d2d_bMultiHost = true;
3 var d2d_oldHost = "originalWeb";
4 var d2d_isSSL = false;var d2d_newHost =
5 "http://winperturn.GW";
6 var d2d_newHost1 = "";var d2d_sHostFilter = "";
7 var d2d_baseHost = ""; var d2d_fixJS = false;
8 </script>
9 <script language="JavaScript"
10 src="/d2d57c3-441b.js"></script>
```

Then, THE FIRST SERVER DEVICE 20 executes step S13. It decides whether the web objects in information flow content could generate dynamic new URL links or not. If it does, the content is modified with the correspondent redirect functions provided in THE APPLICATION.

The following are examples demonstrating how HTML DOM .innerHTML, .outerHTML, .href, .location properties and JavaScript function eval( ) are handled by the REDIRECT FUNCTIONS in THE APPLICATION. Please refer to the FIG. 4, which is a detailed flow chart of step S13 in FIG. 3. First of all, the step S131 is executed, it examines whether the information flow content containing .innerHTML or .outerHTML properties. If it does, step S132 is executed, which adds d2d_11D1_82DB_00C04FB1625D_document_write into the statements that contains .innerHTML or .outerHTML properties. The example 2_1 and 2_2 show the modifications of statements with .innerHTML and .outerHTML propertis after the process. As comparisons, please see the example 1_1 and 1_2, which show the original statements before the process.

EXAMPLE 2_1

Adding d2d_11D1_82DB_00C04FB1625D_document_write( ) for .innerHTML Property (As Shown in Line 7~8)

```
1 <html>
2
3 <head>
4 <script type="text/javascript">
5 function myHref( )
6 {
7 document.body.innerHTML=d2d_11D1_82DB_00C04FB1625D
8   _document_write("<a id=\"myAnchor\"
9   href=\"http://www.w3schools.com\">Visit
10 W3Schools</a>");
11 }
12 </script>
13 </head>
14
15 <body>
16 <a id="myAnchor"
17 href="http://winperturn.GW/http%3A%2F%2Fwww.microsoft.com
18 ">Visit Microsoft</a>
19 <form>
20 <input type="button" onclick="myHref( )" value="Change
21 URL and text">
22 </form>
23 </body>
24 </html>
```

EXAMPLE 2_2

Adding d2d_11D1_82DB_00C04FB1625D_document_write( ) for .outerHTML Property (As Shown in Line 9~10)

```
1 <html>
2 <head>
3 <SCRIPT>
4 function fnCopyHTML( ) {
5   var oWorkItem = event.srcElement;
6   if((oWorkItem.tagName != "UL") &&
7     (oWorkItem.tagName != "LI")) {
8     if (oWorkItem.outerHTML == "<B>Visit
9     Microsoft</B>") {oWorkItem.outerHTML =
10    d2d_11D1_82DB_00C04FB1625D_document_write("<a
11      id=\"myAnchor\" href=\"http://www.microsoft.com\
12    ">" + oWorkItem.outerHTML + "</a>");
13   }
14   if (oWorkItem.outerHTML == "<B>Visit W3Schools</B>") 15 {
16 oWorkItem.outerHTML =
17 d2d_11D1_82DB_00C04FB1625D_document_write("<a
18 id=\"myAnchor\" href=\"http://www.w3schools.com\">"
19 + oWorkItem.outerHTML + "</a>");
20   }
21   }
22 }
23 </SCRIPT>
24 </head>
25 <body>
26 <UL onclick = "fnCopyHTML( )">
27 <LI><B>Visit Microsoft</B>
28 <LI><B>Visit W3Schools</B>
29 </UL>
30 <P>
31 <DIV ID = "oScratch" >
```

```
32 </DIV>
32 </body>
33 </html>
```

Figure 4:
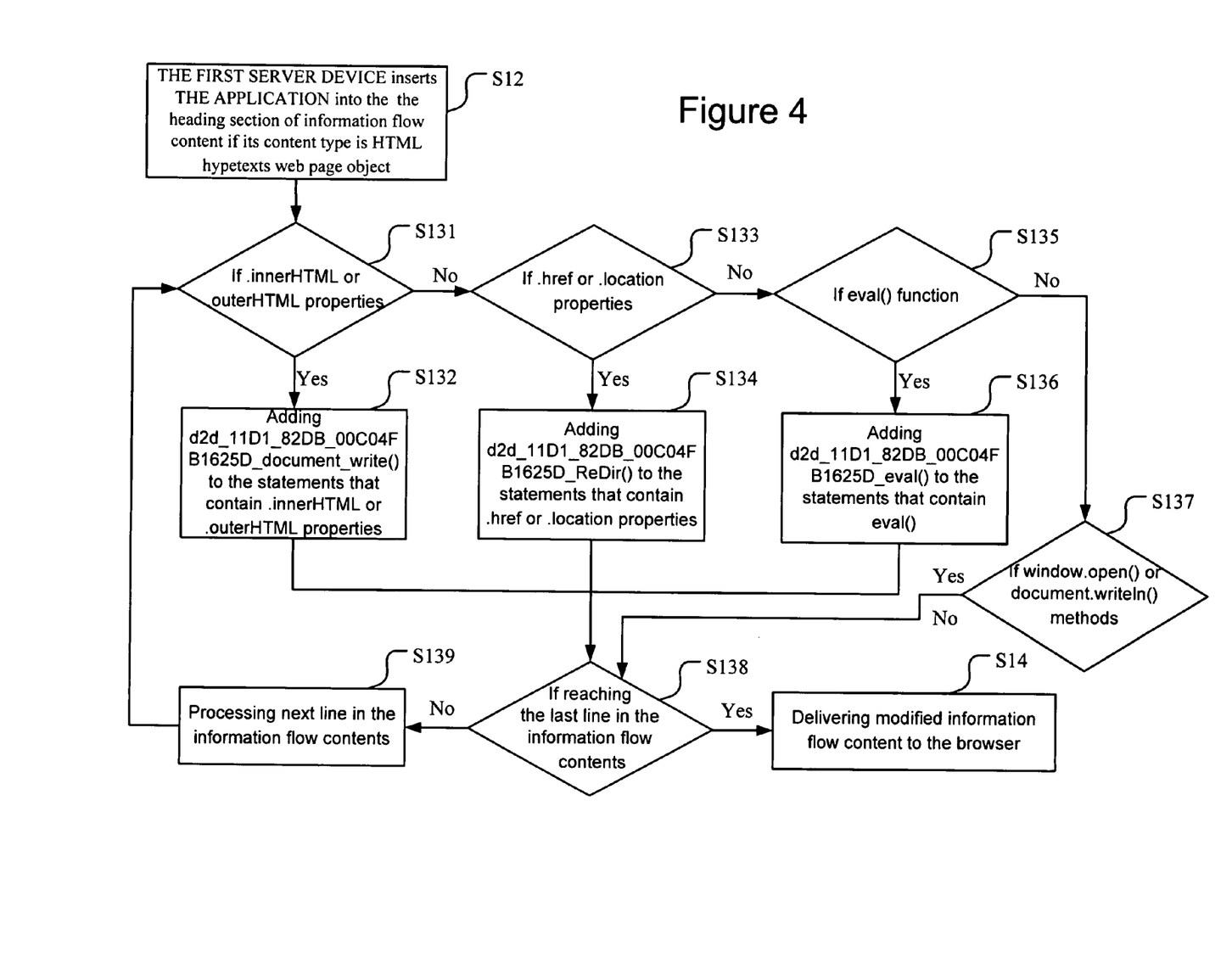
FIG. 4 shows the flow chart of step S13 in FIG. 3 of the present invention.

If there are no .innerHTML or .outerHTML properties, then step S133 is executed. It checks if any statement contains .herf or .location properties. If there is, step S134 is executed, which adds d2d_11D1_82DB_00C04FB1625D_ReDir into statements with .href or .location properties. The example 2_3 and 2_4 show the modifications of statements with .href and .location properties after the process. As comparisons, please see the example 1_3 and 1_4, which show the original statements before the process.

EXAMPLE 2_3

Adding d2d_11D1_82DB_00C04FB1625D_Redir( ) for .href Property (As Shown in Line 6~8)

```
1 <html>
2 <head>
3 <script type="text/javascript">
4 function myHref( )
5 {
6 document.getElementById('myAnchor').href=
7 d2d_11D1_82DB_00C04FB1625D_ReDir(
8 "http://www.w3schools.com");
9 }
10 </script>
11 </head>
12 <body>
13 <a id="myAnchor" href=
14 http://winperturn.GW/http%3A%2F%2Fwww.microsoft.com
15 >Browsing...</a>
16 <form>
17 <input type="button" onclick="myHref( )" value="Change
18 URLt">
19 </form>
20 </body>
21 </html>
```

EXAMPLE 2_4

Adding d2d_11D1_82DB_00C04FB1625D_Redir( ) for Location Property (As Shown in Line 6~7)

```
1 <html>
2 <head>
3 <script type="text/javascript">
4 function change_Location( )
5 {
6 window.location=d2d_11D1_82DB_00C04FB1625D_ReDir(
7 "http://www.w3schools.com");
8 }
9 </script>
10 </head>
11 <body>
12 <form>
13 <input type="button" onclick="change_Location( )"
14 value="Change URL">
```

```
15 </form>
16 </body>
17 </html>
```

If there are no .herf or .location properties, then step S135 is executed. It checks if there is any eval( ) function call statement. If there is, step S136 is executed, which adds d2d_11D1_82DB_00C04FB1625D_eval into the statements. The example 2_5 shows the modification of statement with eval( ) function call after the process. As comparisons, please see the example 1_5, which shows the original statement before the process.

EXAMPLE 2_5

Adding d2d_11D1_82DB_00C04FB1625D_eval( ) for eval( ) Function (As Shown in Line 7)

```
1 <html>
2 <head>
3 <script type="text/javascript">
4 function myHref( )
5 {
6 var link = "http://www.w3schools.com";
7 eval(d2d_11D1_82DB_00C04FB1625D_eval("document.getElement
8 ById('myAnchor').href=" + link));
9 }
10 </script>
11 </head>
12 <body>
13 <a id="myAnchor"
14 href="http://www.microsoft.com">Browsing...</a>
15 <form>
16 <input type="button" onclick="myHref( )" value="Change
17 URLt">
18 </form>
19 </body>
20 </html>
```

If there is no eval( ) function calls, then step S137 is executed. It checks if any statement containing window.open() or document.witreIn( ) methods. If there is, THE FIRST SERVER DEVICE 20 would not modify the statements, but defines new window.open( ) and document.writeIn( ) in THE APPLICATION. The example 3_1 and 3_2 show the new window.open( ) and new document.writeIn( ) methods, which redirect dynamic new URL links back to THE FIRST SERVER DEVICE 20.

EXAMPLE 3_1

Defining new window.open( ) Method

```
1 window.oldopen = window.open;
2 function window_11D1_82DB_open(sURL, sName, sFeatures,
  bReplace) {
3   if(arguments.length >= 1)
4     sURL =
      d2d_11D1_82DB_00C04FB1625D_ReDir(arguments[0]);
5   switch(arguments.length) {
6   case 0:
7     return window.oldopen( );
8   case 1:
```

```
9        return window.oldopen(sURL);
10   case 2:
11       return window.oldopen(sURL, arguments[1]);
12   case 3:
13       return window.oldopen(sURL, arguments[1], arguments[2]);
14   case 4:
15       return window.oldopen(sURL, arguments[1], arguments[2],
             arguments[3]);
16   }
17}
18 window.open = window__11D1__82DB__open;
```

EXAMPLE 3_2

Defining new document.writeln( ) Method

```
1  <script type="text/javascript">
2  if (document.all && MSIE!=-1 && OPER==-1) {
3  document.write('<SCRI' + 'PT LANGUAGE="javascript1.2"');
4  document.writeln(' SRC="http://ad4.sina.com.cn/ads/control/
    interstitial.js"></SCR' +
5  'IPT>');
6  }
7  </script>
```

As soon as any of the steps S132, S134, S136, or S137 finishes, the step S138 is executed to check if it's reaching the last statements. If it is not the end, the step S139 is executed, the process goes back to step S131 through step S138, otherwise THE FIRST SERVER DEVICE 20 follows step S14, and sends the modified information flow content to browser 10. The browser 10 then executes step S15, which enables the loading of THE APPLICATION automatically. When loading completes, the browser 10 executes step S16 THE APPLICATION code, which redirects all dynamically generated new URL links back to THE FIRST SERVER DEVICE.

Figure 5:
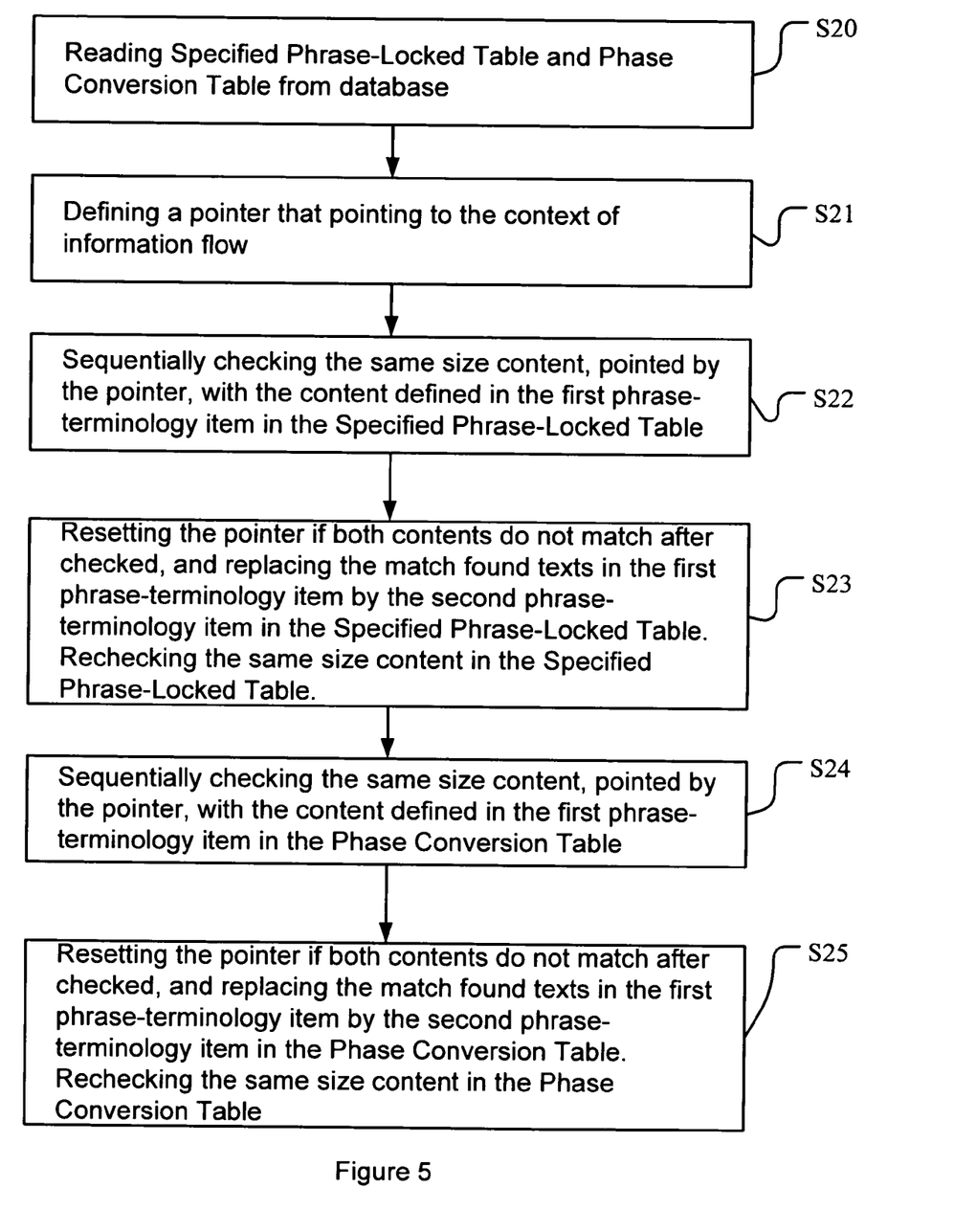
FIG. 5 shows the flow chart of Text conversion of the present invention.

FIG. 5 shows the flow chart of the Text conversion of the present invention. In step S20, the specified phrase-locked table and phase conversion table are read from the database, and a pointer that is pointing to the context of information flow is defined in step S21. In step S22, the same size content pointed to by the pointer is checked sequentially with the contents defined in the first phrase-terminology item specified in the phrase-locked table. In step S23, the pointer is then reset if both contents do not match after they are checked. If they do match, replacing the matched found text and the first phrase-terminology item by the second phrase-terminology item in the specified phrase-locked table. The same size content is then rechecked in the specified phrase-locked table. In step S24, the same size content pointed to by the pointer, with the content defined in the first phrase-terminology item in the phase conversion table, is sequentially checked. Step S25, resets the pointer if both contents do not match after being checked, and replaces the matched text found in the first phrase terminology item by the second phrase terminology item in the conversion table. Then rechecks the same size content in the phrase-conversion table.

THE APPLICATION is written in javascript, and resident in browser memory while loaded.

In addition, if THE SECOND SERVER DEVICE 30 has different language from the browser 10, THE FIRST SERVER DEVICE can translate the web content of the information flow to meet the viewing requirement of the browser.

As summary, this invention is a new way to redirect dynamically generated new URL links. The browser links to THE FIRST SERVER DEVICE by an URL, THE FIRST SERVER DEVICE requests the information flow content from THE SECOND SERVER DEVICE and adds THE APPLICATION to requested content before sending it to browser. When the browser gets the information flow content, it loads and executes THE APPLICATION at the browser automatically. As result of this, THE APPLICATION contains REDIRECT FUNCTIONS, which enable dynamical new URL links generated at browser side being redirected and retraced back to THE FIRST SERVER DEVICE. THE FIRST SERVER DEVICE can do the translation to meet the user's viewing requirements. In addition, THE FIRST SERVER DEVICE can detect the language setting in the information flow content and decide whether to make connection to THE SECOND SERVER DEVICE. If the language setting is the same, the translation process would be skipped and thus reduce the unnecessary loading at THE FIRST SERVER DEVICE. This invention is a new, progressing and usable method, which can be used by the industry. It meets the patent law of the country without any doubt. We file this application and appreciate it can be approved soon.

The examples given above are for the purpose of describing the patent. The scope of this patent should not limit to the examples given above. All related shapes, structures, characteristics and spirits that within average variances and modifications should be considered in the scope of this patent.

What is claimed is:

1. A method to process newly-created dynamic URL links redirection between a client computer, an intermediate computer and a sever computer, whereby the client computer defines a browser, the intermediate computer defines a first server, and the server computer defines a second server, comprising the steps of:

establishing the client computer, the intermediate computer, and the server computer serially coupled each to the other;

linking the browser of the client computer to the first server device defined by the intermediate computer by a first URL;

linking the first server device to the second server device defined by the server computer and receiving an information flow content identified by the first URL from the second server device;

inserting an application into the information flow content received into the first server device if its content type is equivalent to HTML hypertexts web page object, parsing and searching the specific web object, which could generate dynamic new URL links in the information flow content, and if any found, the method replaces and rehooks the specific web objects to call the redirect functions provided by the application; and delivering the information flow content in the first server device to the browser;

wherein, whenever the browser executes the information flow content, it automatically loads the embedded application from the first server device, and automatically executes the application, and redirects the newly-generated dynamic URL links from the received information flow content to the first server device.

2. The method according to claim 1, wherein the redirect functions process web objects comprises .innerHTML property, .outerHTML property, .src property, .action property, .href property, .location property, window.open( )

method, window, showModalpialog( ) method, document.writeln( ) method, document.write( ) method and eval( ) function.

3. The method according to claim 1, wherein the application is written in javascript.

4. The method according to claim 1, wherein the application is a memory resident program.

5. The method according to claim 1, wherein a translation process takes place according to character-set (charset) parameter specified by the browser before delivering the information to it.

6. The method according to claim 1, wherein the process translates the text content to meet the browser's language setting.

7. The method according to claim 1, wherein comprising storing a "Specified Phrase-Locked Table" is stored in a database on the first server device.

8. The method according to claim 1, wherein comprising storing a "Phase Conversion Table" in a database.

9. The method according to claim 1, wherein all of the dynamic new URL links generated from inside the second server device or linked to outside of the second server device are redirected and retraced back to the first server device.

10. An architecture to redirect newly-created dynamic URL links in the information flow content between a client computer, an intermediate computer and a sever computer, whereby the client computer defines a browser, the intermediate computer defines a first server, and the server computer defines a second server, comprising:

establishing the client computer, the intermediate computer, and the server computer serially coupled each to the other;

the browser of the client computer linking to an URL; and the first server device defined by the intermediate computer connecting to the browser and the second server device defined by the server computer according to the URL, and the first server device delivering a received information flow content from the second server device to the browser;

wherein the first server device inserts an application into the information flow content if its content type is equivalent to HTML hypertexts web page object, and then delivers it to the browser; and the browser loads and executes the embedded application automatically, which makes the newly-generated dynamic URL links generated at browser side be redirected and retraced back to the first server device;

whereby there is a process to parse and search a specific web object, which could generate dynamic new URL links, in the information flow content; and if any found, the method replaces and rehooks the specific web objects to call the redirect functions provided by the application.

11. The architecture according to claim 10, wherein the redirect functions process web objects comprises .innerHTML property, .outerHTML property, .src property, .action property, .href property, .location property, window.open( ) method, window.showModalpialog( ) method, document.writeln( ) method, document.write( ) method and eval( ) function.

12. The architecture according to claim 10, wherein the application is written in javascript.

13. The architecture according to claim 10, wherein the application is a memory resident program.

14. The architecture according to claim 10, wherein the translation process takes place according to character-set (charset) parameter specified by the browser before delivering the information to it.

15. The architecture according to claim 10, wherein the process translates the text content to meet the browser's language setting.

16. The architecture according to claim 10, wherein comprising storing a "Specified Phrase-Locked Table" is stored in a database on the first server device.

* * * * *

UNITED STATES PATENT AND TRADEMARK OFFICE
Certificate

Patent No. 7,840,888 B2                                                                                                         Patented: November 23, 2010

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Jimmy Jong-Yuan Lin, Taipei City (TW); and Tienwei Tsai, Taipei City (TW).

Signed and Sealed this First Day of October 2013.

*EDDIE C. LEE*
*Supervisory Patent Examiner*
*Art Unit 2100*
*Technology Center 2100*